Sept. 6, 1927.   H. P. DAHLSTRAND   1,641,740
COUPLING
Filed April 3, 1922
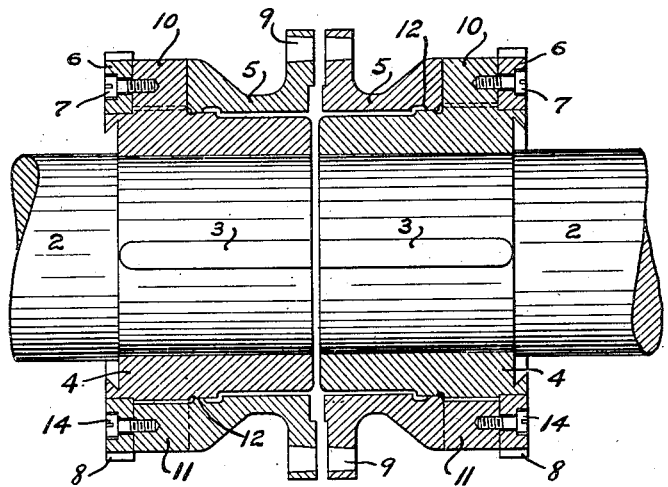
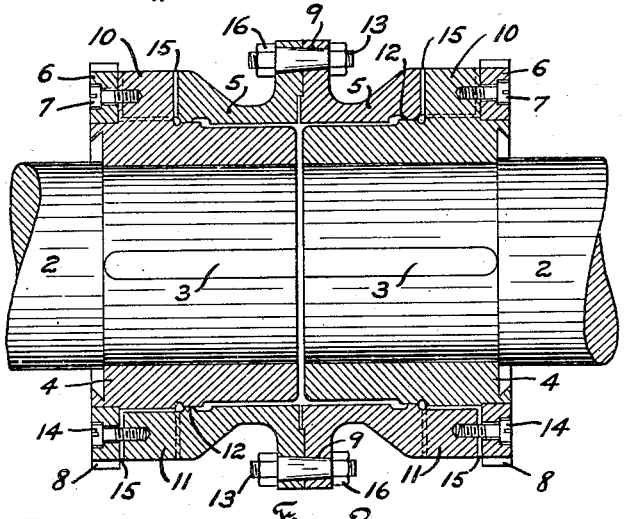
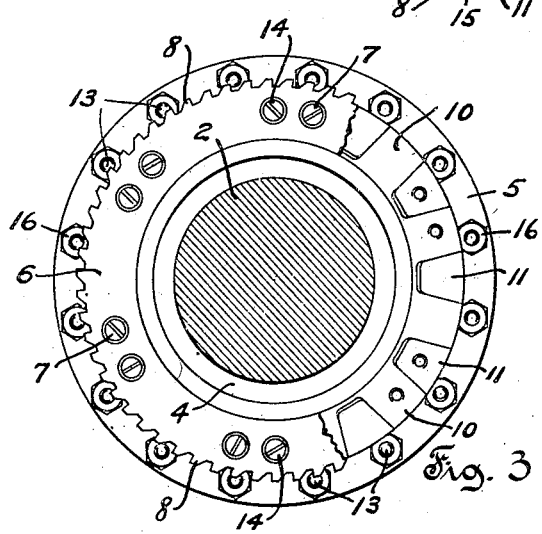

Patented Sept. 6, 1927.

1,641,740

UNITED STATES PATENT OFFICE.

HANS P. DAHLSTRAND, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE.

COUPLING.

Application filed April 3, 1922. Serial No. 549,090.

This invention relates in general to improvements in couplings, and relates more specifically to improvements in the construction and operation of coupling devices for uniting two movable elements such as rotary shafts.

An object of the invention is to provide a coupling which is simple in construction and efficient in operation. A more specific object of the invention is to provide an improved shaft coupling adapted to normally transmit motion from one of the shafts to the other, but which may be readily disconnected to permit independent rotation of the shafts. A further object of the invention is to provide an extremely simple and compact coupling especially adapted to drivingly connect adjacent shafts which are relatively axially movable or which are slightly out of axial alinement.

In the operation of certain types of machines such as steam turbine driven generators, it is quite frequently desirable to disconnect the driving and driven members and to rotate these members independently of each other. The present invention contemplates the provision of a coupling especially applicable to such machines, which may be conveniently disconnected whenever desirable.

A clear conception of an embodiment of the invention and of the operation of couplings constructed in accordance therewith, may be had by referring to the drawing accompanying and forming a part of this specification, in which like reference characters designate the same or similar parts in the several views.

Fig. 1 is a longitudinal vertical section through an improved coupling, showing the elements in disconnected position.

Fig. 2 is a longitudinal vertical section through an improved coupling showing the same providing a direct driving connection from one shaft to another.

Fig. 3 is an end view of the improved coupling having a portion thereof broken away in order to more clearly disclose details of the construction.

The shaft coupling illustrated in the drawing comprises in general a pair of coupling members 4 snugly fitting and rigidly attached to the adjacent ends of rotary shafts 2, by means of keys 3, a pair of sleeve members 5 interlocked with the adjacent coupling members 4, and a pair of ring members 6 associated one with each set of members 4, 5. Each of the coupling members 4 is provided with an annular series of radial outwardly projecting lugs 10 which are engageable with a series of intervening lugs 11 formed integral with the adjacent sleeve member 5. Each sleeve member 5 has a bored internal surface 12 cooperable with a corresponding external surface formed upon the adjacent member 4, these surfaces 12 serving to properly center the sleeve members 5. The sleeve members 5 are also provided with outwardly projecting annular flanges having alined openings 9 therethrough. With the coupling elements providing a driving connection as illustrated in Fig. 2, stud bolts 13 are located in the alined openings 9 on the sleeve members 5, and are provided with nuts 16 which rigidly unite the coacting sleeve members 5. The ring members 6 are permanently and rigidly attached to the ends of the lugs 10 of the coupling members 4 by means of cap screws 7, and are provided with peripheral teeth 8 which enable rotation of the shafts 2 with the aid of a bar or other implement applied to the teeth 8. The rings 6 are also provided with transverse through openings located opposite to the ends of some of the intervening lugs 11, these through openings permitting insertion of other cap screws 14.

With the shafts 2 directly connected as illustrated in Fig. 2, the cap screws 14 are released and the teeth of the members 4, 5 have spaces 15 adjacent their respective ends. With the cap screws 14 positioned as illustrated in Fig. 2, the shafts 2 should be in axial alinement with each other and there is no relative motion between the sleeve members 5 and the coupling members 4. If the shafts 2 are not in axial alinement with each other, the cap screws 14 should be removed in order to permit the sleeve members 5 to move relatively to each other during rotation of the shafts 2. Such removal of the cap screws 14, should also be effected in case relative end play is desired between the shafts 2.

When it becomes desirable to disconnect the shafts 2 as indicated in Fig. 1, such disconnection may be readily effected by removing the stud bolts 13 and nuts 16 and manipulating the cap screws 14 to draw the lugs 11 of the sleeve members 5 into snug engagement with the ring members 6, as indicated in Fig. 1. With the elements thus arranged, the sleeve members 5 are spaced endwise from each other and the shafts 2 are independently rotatable without interference.

It will thus be noted that the present invention provides a coupling capable of transmitting rotary motion from one element to another at relatively high speed making the coupling especially applicable to high speed machines such as turbo-generators. The jaws or lugs 10, 11 may be readily lubricated along the coacting surfaces. The coupling may be conveniently disconnected to permit independent rotation of the normally connected members, without necessity of removing cumbersome parts and without the use of tools other than an ordinary wrench and screw driver. The coupling also permits rigid connection of axially alined driving and drived members and is capable of providing such flexibility as may be required when the shafts are slightly out of alinement or when relative end play is desired.

It should be understood that it is not desired to limit the invention to the exact details of construction and of operation herein shown and described, for various modifications within the scope of the claims may occur to persons skilled in the art.

It is claimed and desired to secure by Letters Patent:

1. In combination, a pair of rotary elements, a sleeve comprising a pair of interlocked sections each of which is positively drivingly connected to one of said elements, and means for withdrawing said sections from each other and for subsequently rigidly holding each section against the adjoining element to provide a space between said sections when the interlock is removed.

2. In combination, a pair of rotary elements each having a coupling member rigidly attached thereto, a sleeve comprising a pair of interlocked sections each of which is positively drivingly connected to one of said members, and means for withdrawing said sections from each other and for subsequently rigidly holding each section against the adjoining member to provide a space between said sections when the interlock is removed.

3. In combination, a pair of rotary elements each having a coupling member rigidly attached thereto, a sleeve comprising a pair of sections each of which is positively drivingly connected to one of said members, bolts for positively connecting said sleeve sections, and means for withdrawing said sections from each other and for subsequently rigidly holding each section against the adjoining member to provide a space between said sections when said bolts are removed.

4. In combination, a pair of rotary elements, a sleeve comprising a pair of sections each of which is positively drivingly connected to one of said elements, bolts for positively connecting said sleeve sections, and means carried by said elements for withdrawing said sections from each other and for subsequently rigidly holding each section against the adjoining element to provide a space between said sections when the said bolts are removed.

5. In combination, a pair of rotary elements, a sleeve comprising a pair of sections each of which is positively drivingly connected to one of said elements, bolts for positively connecting said sleeve sections, and means for withdrawing said sections from each other and for subsequently rigidly holding each section against the adjoining element to provide a space between said sections when said bolts are removed.

In testimony whereof, the signature of the inventor is affixed hereto.

HANS P. DAHLSTRAND.